(12) United States Patent
Eser et al.

(10) Patent No.: US 7,891,347 B2
(45) Date of Patent: Feb. 22, 2011

(54) METHOD AND DEVICE FOR OPERATING AN INTERNAL COMBUSTION ENGINE

(75) Inventors: Gerhard Eser, Hemau (DE); Bernhard Klingseis, Neutraubling (DE); Gerhard Schopp, Pettendorf (DE)

(73) Assignee: Continental Automotive GmbH, Hannover (DE)

( * ) Notice: Subject to any disclaimer, the term of this patent is extended or adjusted under 35 U.S.C. 154(b) by 1008 days.

(21) Appl. No.: 11/725,754

(22) Filed: Mar. 20, 2007

(65) Prior Publication Data

US 2007/0277778 A1      Dec. 6, 2007

(51) Int. Cl.
*F02D 41/14* (2006.01)
(52) U.S. Cl. .................. 123/676; 123/90.15; 73/114.76
(58) Field of Classification Search .................. 123/676, 123/90.15–90.18; 73/114.76
See application file for complete search history.

(56) References Cited

U.S. PATENT DOCUMENTS

2005/0199216 A1*   9/2005   Matsumoto ................. 123/396
2008/0190405 A1*   8/2008   Eser et al. ................... 123/676
2010/0037685 A1*   2/2010   Touchette ................ 73/114.76
2010/0078001 A1*   4/2010   Kolmanovsky et al. ..... 123/676

FOREIGN PATENT DOCUMENTS

DE   10 2004 043 365 A1   3/2006
EP        0 417 984 A1    3/1991

* cited by examiner

*Primary Examiner*—Erick Solis
(74) *Attorney, Agent, or Firm*—King & Spalding L.L.P.

(57) ABSTRACT

The invention relates to the operation of an internal combustion engine, a first model value or a second model value of the exhaust gas counter pressure is determined upstream of the exhaust gas catalytic converter of the internal combustion engine as a function of at least one operating variable of the internal combustion engine, which is representative of the exhaust gas counter pressure in a current operating mode of the internal combustion engine, assuming a low valve lift or a high valve lift.

18 Claims, 3 Drawing Sheets

METHOD AND DEVICE FOR OPERATING AN INTERNAL COMBUSTION ENGINE

CROSS REFERENCE TO RELATED APPLICATIONS

This application claims priority of German application No. 10 2006 013 501.6 filed Mar. 23, 2006, which is incorporated by reference herein in its entirety.

FIELD OF INVENTION

The invention relates to a method and a device for controlling an internal combustion engine. The internal combustion engine comprises an intake tract and an exhaust gas tract with an exhaust gas catalytic converter. The intake tract and the exhaust gas tract communicate with at least one combustion chamber of the internal combustion engine depending on the position of at least one gas intake valve or at least one gas discharge valve. In addition, the internal combustion engine comprises a valve lift adjusting device, by means of which it is possible to adjust a valve lift of the gas intake valve and/or the gas discharge valve.

BACKGROUND OF THE INVENTION

A method and a device for determining the exhaust gas counter pressure is known from EP 0 417 984 A1. In order to determine the exhaust gas counter pressure, during a valve overlap phase, in which a gas intake valve and a gas discharge valve of the internal combustion engine have been opened at the same time, a pressure is determined in the housing of a crankshaft of the internal combustion engine. The exhaust gas counter pressure is determined depending on the pressure in the housing of a crankshaft during the valve overlap phase.

SUMMARY OF INVENTION

The object of the invention is to create a method and a device for operating an internal combustion engine which ensures an accurate operation of the internal combustion engine.

The features of the independent patent claims achieve the object of the invention. Advantageous embodiments of the invention are identified in the subclaims.

The invention is characterized by a method and a corresponding device for operating an internal combustion engine. The internal combustion engine comprises an intake tract and an exhaust gas tract with an exhaust gas catalytic converter. The intake tract and the exhaust gas tract communicate with at least one combustion chamber of the internal combustion engine depending on the position of at least one gas intake valve or at least one gas discharge valve. In addition, the internal combustion engine comprises a valve lift adjusting device, by means of which it is possible for a valve lift of the gas intake valve and/or the gas discharge valve to be adjusted. In order to operate the internal combustion engine, a first model value of an exhaust gas counter pressure is determined upstream of the exhaust gas catalytic converter as a function of at least one operating variable of the internal combustion engine. The first model value of the exhaust gas counter pressure is representative of the exhaust gas counter pressure in a current operating mode of the internal combustion engine by assuming a low valve lift. In addition, a second model value of the exhaust gas counter pressure is determined upstream of the exhaust gas catalytic converter as a function of at least one operating variable of the internal combustion engine. The second model value is representative of the exhaust gas counter pressure in a current operating mode of the internal combustion engine by assuming a high valve lift. When adjusting the valve lift and/or shortly before the adjustment of the valve lift from the low valve lift to the high valve lift or from the high valve lift to the low valve lift, a curve of a filtered first model value is determined as a function of the first model value of the exhaust gas counter pressure when adjusting the valve lift and as a function of the current second model value of the exhaust gas counter pressure or as a function of the second model value of the exhaust gas counter pressure when adjusting the valve lift and as a function of the current first model value of the exhaust gas counter pressure. In addition, during the adjustment of the valve lift and/or shortly before the adjustment of the valve lift, a curve of the current value of the exhaust gas counter pressure is allocated to the curve of the filtered first model value.

This contributes to the fact that during the adjustment of the valve lift or shortly before the adjustment of the valve lift, the current value of the exhaust gas counter pressure can be approximated in a particularly accurate manner and jumps in the curve of the current value of the exhaust gas counter pressure can be avoided in all cases. This contributes to an especially accurate operation of the internal combustion engine.

In an advantageous embodiment of the method, the curve of the filtered model value of the exhaust gas counter pressure is determined by means of a lowpass filter. This has the advantage that it is possible to determine the curve of the filtered model value of the exhaust gas counter pressure in an easier way.

In a further advantageous embodiment of the method, the current second model value or the current first model value of the exhaust gas counter pressure is predetermined as the target value for lowpass filtering. This facilitates an especially accurate determination of the curve of the filtered model value of the exhaust gas counter pressure.

In a further advantageous embodiment of the method, the curve of the filtered model value of the exhaust gas counter pressure is determined in such a way that the filtered model value of the exhaust gas counter pressure approaches the current second model value or the current first model values of the exhaust gas counter pressure in a step-by-step manner. Therefore, the filtered model value of the exhaust gas counter pressure approaches the current second model value or the current first model value of the exhaust gas counter pressure in such a way that the filtered model value of the exhaust gas counter pressure approaches the current second model value or the current first model value of the exhaust gas counter pressure with each step less than it did in the previous step. This makes it a simple matter to specify the size of the step and thereby the filter conditions in order to determine the curve of the filtered model value of the exhaust gas counter pressure.

In a further advantageous embodiment of the method, in order to determine the curve of the filtered model value of the exhaust gas counter pressure, a maximum gradient of the curve of the filtered model value of the exhaust gas counter pressure is predetermined as a function of a first model value or a second model value of the exhaust gas counter pressure when adjusting the valve lift and as a function of the current second model value or the current first model value of the exhaust gas counter pressure. The maximum gradient is specified in such a way that in the case of otherwise stationary operating conditions of the internal combustion engine, the filtered model value of the exhaust gas counter pressure approaches the current second model value or the current first model value of the exhaust gas counter pressure in a linear way. This makes it possible to determine the curve of the filtered model value of the exhaust gas counter pressure in an especially simple manner.

In a further advantageous embodiment of the method, the curve of the filtered model value of the exhaust gas counter pressure is determined in such a way that the filtered model value of the exhaust gas counter pressure changes by a maximum of ten hectopascals per cylinder segment or per ten milliseconds. This contributes to the fact that the current value of the exhaust gas counter pressure represents the actual exhaust gas counter pressure in a very accurate manner.

In a further advantageous embodiment of the method, at the point in time of adjusting the valve lift, the model value of the exhaust gas counter pressure, which is representative of the exhaust gas counter pressure in which the current valve lift is adjusted, is kept constant for a predetermined period of time and allocated to the current value of the exhaust gas counter pressure. After the predetermined period of time after the valve lift has been adjusted, the curve of the filtered model value of the exhaust gas counter pressure is determined and allocated to the current value of the exhaust gas counter pressure. This contributes to the fact that a gas running time from the gas intake valve to the exhaust gas catalytic converter can be taken into account. The gas running time can for example refer to the time duration needed by the air, the fuel, and/or the exhaust gas to arrive at the exhaust gas catalytic converter from the gas intake valve.

In a further advantageous embodiment of the method, the filtered model value of the exhaust gas counter pressure is compared to the current second model value or the current first model value of the exhaust gas counter pressure. The curve of the filtered model value of the exhaust gas counter pressure is only determined for this length of time and subsequently allocated to the current value of the exhaust gas counter pressure until a difference between the filtered model value of the exhaust gas counter pressure and the current second model value or the current first model value of the exhaust gas counter pressure is less than a predetermined threshold value. This makes it possible for the curve of the filtered model value of the exhaust gas counter pressure to only be determined as long as necessary. In particular, when a software product is used for filtering this makes possible to relieve the load on an engine control which is assigned to the internal combustion engine and which includes the software product.

The advantageous embodiments of the method can easily be transferred to advantageous embodiments of the device.

BRIEF DESCRIPTION OF THE DRAWINGS

The invention is explained in greater detail below with reference to schematic diagrams.

These are as follows.

Elements with the same design or function are identified in all the figures by the same reference symbols.

DETAILED DESCRIPTION OF INVENTION

An internal combustion engine (FIG. 1) includes an intake tract 1, an engine block 2, a cylinder head 3 and an exhaust gas tract 4. The intake tract 1 preferably includes a throttle valve 5, a manifold 6 and an intake pipe 7, which is routed to a cylinder Z1 via an intake port in a combustion chamber 9 in an engine block 2. The engine block 2 also includes a crankshaft 8, which is connected to the piston 11 of a cylinder Z1 by means of a connecting rod 10. The internal combustion engine preferably includes additional cylinders Z2-Z4 in addition to the cylinder Z1. However, it is also possible for the internal combustion engine to comprise any given greater number of cylinders Z1-Z4. The internal combustion engine is preferably arranged in a motor vehicle.

Figure 1:
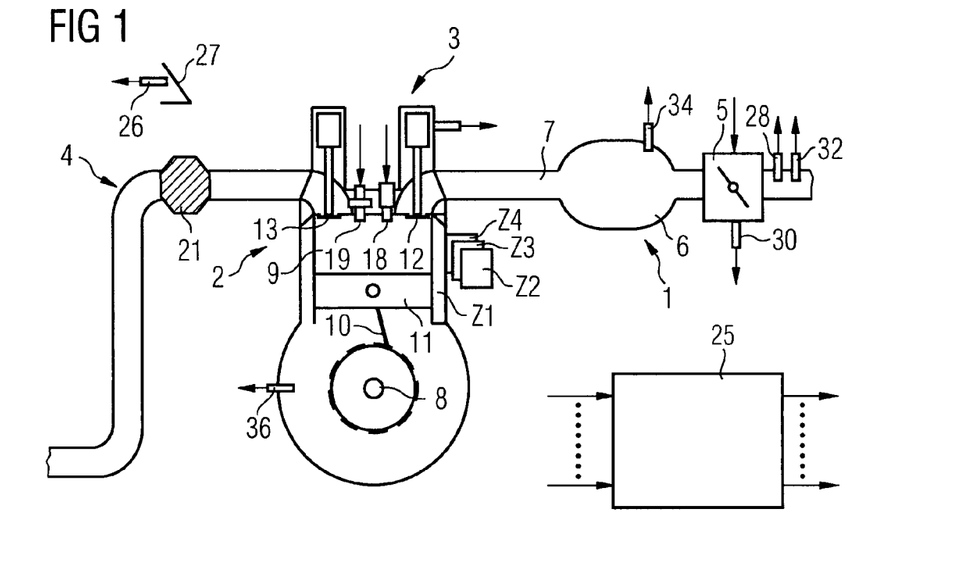
FIG. 1 an internal combustion engine,
FIG. 2 a further view of the internal combustion engine,
FIG. 3 a lowpass filter,
FIG. 4 a signal curve of an exhaust gas counter pressure,
FIG. 5 a program for determining the exhaust gas counter pressure.

The intake tract 1 and the exhaust gas tract 4 communicate with the combustion chamber 9 of the internal combustion engine depending on the position of a gas intake valve 12 or a gas discharge valve 13.

The cylinder head 3 also preferably includes both an injection valve 18 and a spark plug 19. Alternatively, the injection valve 18 can also be arranged in the intake pipe 7. The exhaust gas tract 4 preferably includes an exhaust gas catalytic converter 21, which is preferably embodied as a three-way catalytic converter.

A valve lift adjusting device (FIG. 2) comprises for example a small cam 52 and a large cam 54, which are for example arranged on an intake camshaft 50. The valve lift adjusting device allows adjustment of a valve lift VLIFT (FIG. 5) of the gas intake valve 12 and/or the gas discharge valve 13. The intake camshaft 50 is connected to the crankshaft 8 by means of a transmission element 68 and is driven by the crankshaft 8 by means of a transmission element 68. Should the intake camshaft 50 be adjusted in such a way that the small cam 52 of the intake camshaft 50 acts on the gas intake valve 12, then this brings about a valve lift X1 of the gas intake valve 12. Should the intake camshaft 50 be adjusted in such a way that the large cam 54 of the intake camshaft 50 acts on the gas intake valve 12, then this brings about a high valve lift X2 of the gas intake valve 12. As an alternative or in addition the valve lift adjusting device can also comprise a small cam 62 of an exhaust camshaft 60 and a large cam 64 of the exhaust camshaft 60.

Figure 2:
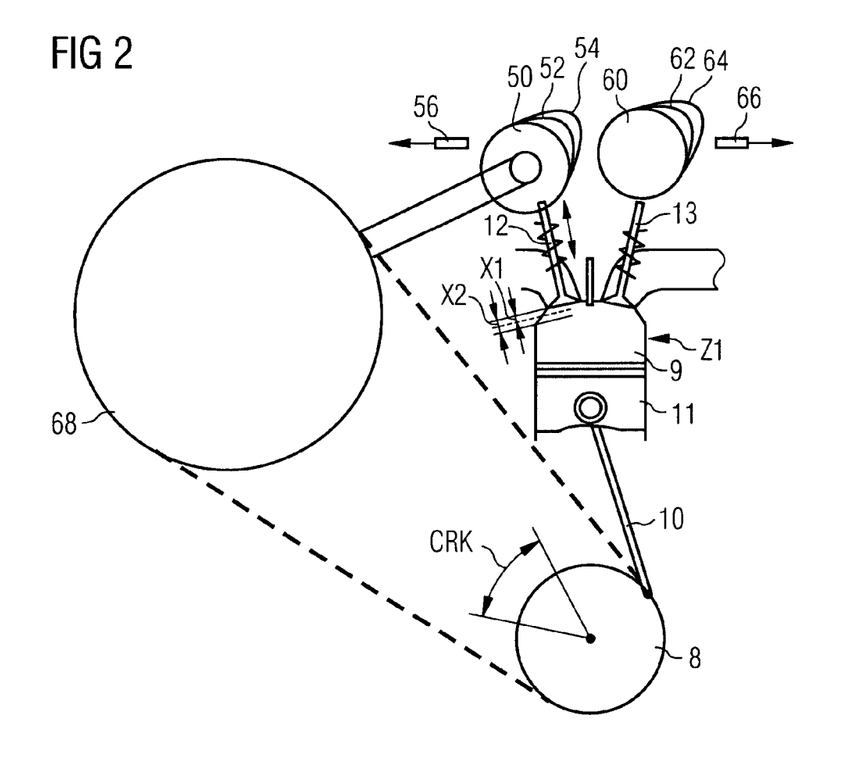

In addition to the cams 52, 54, 62, 64, the valve lift adjusting device also comprises a device for the adjustment of the position of the intake camshaft 50 and/or the exhaust camshaft 60 so that, depending on the position of the camshafts 50, 60 either the small cams 52, 62 or the large cams 54, 64 act on the gas intake valve 12 or the gas discharge valve 13.

Alternatively, it is possible for the valve lift adjusting device can also comprise the cams 52, 54, 62, 64 with a uniform camshaft contour, with the different valve lifts VLIFT for example being able to be adjusted by means of a final control element, which has been arranged in the gas intake valve 12 or the gas discharge valve 13. In addition, an internal combustion engine can include a valve lift adjusting device, which makes possible a stepless adjustment ADJ of the valve lift VLIFT.

A control device 25 is provided to which sensors are assigned, said sensors detecting the different measured quantities and in each case determining the measured value of the measured quantity. The control device 25 determines, in accordance with at least one of the measured quantities, the controlling variables, which are then converted into one or more adjusting signals for controlling the final control elements by means of corresponding actuators. In addition, the control device 25 determines operating variables which are further processed for operating an internal combustion engine as a function of at least one of the measured quantities. In addition, a measured quantity can also be an operating variable. The control device 25 can also be referred to as a device for controlling an internal combustion engine.

The sensors are a pedal position indicator 26 which detects the position of an gas pedal 27, an air mass flow meter 28 which detects an air mass flow upstream of the throttle valve 5, a throttle valve position sensor 30 which detects a degree of opening of the throttle valve 5, a temperature sensor 32 which detects the intake air temperature, an intake pipe pressure sensor 34 which detects the intake pipe pressure in a manifold 6, a crankshaft angle sensor 36 which detects a crankshaft angle CRK to which a rotational speed of the internal combustion engine is then allocated. In order to detect the position of the intake camshaft 50 and/or the exhaust camshaft 60 an intake camshaft sensor 56 or an exhaust camshaft sensor 66 can be provided (FIG. 2).

Depending on the embodiment of the invention, there can be any subset of the mentioned sensors or there can even be additional sensors.

The final control elements are, for example, the throttle valve 5, the gas intake and the gas discharge valves 12, 13, the injection valve 18, the valve lift adjusting device and/or the spark plug 19.

A suitable cylinder filling of the cylinder Z1-Z4 with air and/or fuel can be determined in a very accurate manner, if the process takes account of an exhaust gas counter pressure upstream of the exhaust gas catalytic converter 21. Therefore, in order to operate the internal combustion engine, a first model value and a second model value EGBP_MDL_1, EGBP_MDL_2 of the exhaust gas counter pressure is determined upstream of the exhaust gas catalytic converter 21 (FIG. 2, FIG. 3) in a preferred manner. The first model value EGBP_MDL_1 of the exhaust gas counter pressure is representative of the exhaust gas counter pressure in a current operating condition of the internal combustion engine on the assumption that currently the low valve lift X1 is set. The second model value EGBP_MDL_2 of the exhaust gas counter pressure is representative of the exhaust gas counter pressure in the current operating condition of the internal combustion engine on the assumption that currently the high valve lift X2 is set. If the internal combustion engine is operated with the low valve lift X1, the first model value EGBP_MDL_1 of the exhaust gas counter pressure is allocated to a current value EGBP_AV of the exhaust gas counter pressure. Should the internal combustion engine be operated with a high valve lift X2, the second model value EGBP_MDL_2 of the exhaust gas counter pressure is allocated to the current value EGBP_AV of the exhaust gas counter pressure. The first model value and the second model value EGBP_MDL_1, EGBP_MDL_2 of the exhaust gas counter pressure are then also determined in a preferred manner if the internal combustion engine is operated with the high valve lift or the low valve lift X2, X1.

The exhaust gas counter pressure represents the difference between the pressure upstream of the exhaust gas catalytic converter 21 and the pressure downstream of the exhaust gas catalytic converter 21. The exhaust gas counter pressure mainly depends on the mass air flow which flows through the throttle valve 5 of the intake tract 1 into the combustion chamber 9 and which flows from the combustion chamber 9 into the exhaust gas tract 4. The mass air flow in the combustion chamber 9, and for this reason also the exhaust gas counter pressure, depends on the valve lift VLIFT. In addition, the exhaust gas counter pressure depends on a fuel mass, which is fed to the combustion chamber 9 for a combustion process.

If only the valve lift VLIFT is adjusted and the internal combustion engine otherwise remains in a stationary operating condition, there could, because of the adjustment ADJ of the valve lift VLLIFT be a jump in a curve of the current value EGBP_AV of the exhaust gas counter pressure, since, when the model values EGBP_MDL_1, EGBP_MDL_2 of the exhaust gas counter pressure are allocated to the current value of the exhaust gas counter pressure, switching from one model value EGBP_MDL_1, EGBP_MDL_2 of the exhaust gas counter pressure changes to the other model value EGBP_MDL_1, EGBP_MDL_2 of the exhaust gas counter pressure which takes place in jumps. This jump in the curve of the current value EGBP_AV of the exhaust gas counter pressure is not representative of the actual exhaust gas counter pressure. For example, on the basis of gas running times within the internal combustion engine, for example, a period that is needed by the mass air flow from the gas intake valve 12 until it reaches the exhaust gas catalytic converter 21, the actual exhaust gas counter pressure does not change in a jerky manner. Thus a curve of a filtered model value EGBP_MDL_FIL of the exhaust gas counter pressure is preferably determined during the adjustment ADJ of the valve lift VLIFT and/or shortly before the adjustment ADJ of the valve lift VLIFT. The curve of the filtered model value EGBP_MDL_FIL does then not exhibit the jump and corresponds to the actual exhaust gas counter pressure as an approximation.

Figure 3:
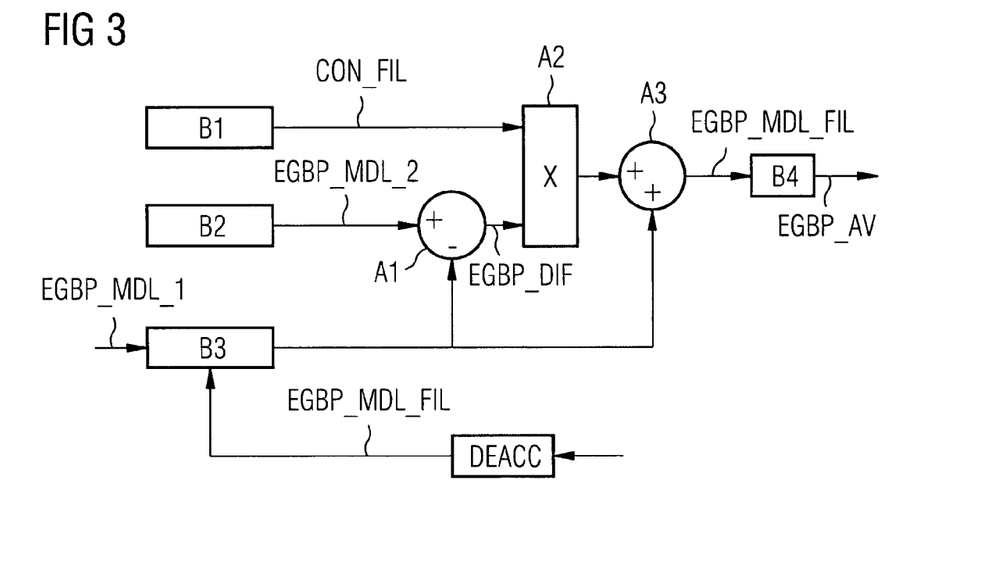

The curve of the filtered model value EGBP_MDL_FIL of the exhaust gas counter pressure is preferably determined with a lowpass filter (FIG. 3). The curve of the filtered model value EGBP_MDL_FIL of the exhaust gas counter pressure is determined as a function of the first model value and the second model value EGBP_MDL_1, EGBP_MDL_2 of the exhaust gas counter pressure.

In a block B1, a filter constant CON_FIL is fed into the lowpass filter.

Should a low valve lift be converted to the high valve lift X1, X2, in a block B2, the current second model value EGBP_MDL_2 of the exhaust gas counter pressure is fed into the lowpass filter. Should a high valve lift be converted to the low valve lift X1, X2, then in a block B2, the current first model value EGBP_MDL_1 of the exhaust gas counter pressure is fed into the lowpass filter.

In a block B3, the first model value or the second value EGBP_MDL_1, EGBP_MDL_2 of the exhaust gas counter pressure, which is present when adjusting ADJ the valve lift VLIFT, is fed into the lowpass filter. In this context, the adjustment ADJ can mean immediately before, during, or immediately after the point in time of adjusting ADJ the valve lift VLIFT. In addition, in the block B3, the filtered model value EGBP_MDL_FIL of the exhaust gas counter pressure is fed back in order to determine further the curve of the filtered model value EGBP_MDL_FIL of the exhaust gas counter pressure.

In an addition point A1, a difference EGBP_DIF (FIG. 5) between the first model value or the second model value EGBP_MDL_1, EGBP_MDL_2 of the exhaust gas counter pressure or the filtered model value EGBP_MDL_FIL of the exhaust gas counter pressure and the second model value or the first model value EGBP_MDL_2, EGBP_MDL_1 of the exhaust gas counter pressure is determined.

The difference EGBP_DIF of the exhaust gas counter pressure is multiplied in a multiplication point A2 with the filter constant CON_FIL.

In an addition point A3, the first model value or the second model value EGBP_MDL_1, EGBP_MDL_2 of the exhaust gas counter pressure or the filtered model value EGBP_MDL_FIL of the exhaust gas counter pressure is added to the result of the multiplication in a multiplication point A2.

In a block B4, the filtered model value EGBP_MDL_FIL of the exhaust gas counter pressure is allocated to the current value EGBP_AV of the exhaust gas counter pressure. The current value EGBP_AV of the exhaust gas counter pressure is preferably used for the further calculation of additional operating variables for other motor vehicle functions. The filtered model value EGBP_MDL_FIL is sent to a block B3 with a time delay DEACC and fed back into the lowpass filter.

The shown lowpass filter produces a stepped curve (FIG. 4) of the filtered model value EGBP_MDL_FIL of the exhaust gas counter pressure, which approaches the current second model value or the current first model value EGBP_MDL_2, EGBP_MDL_1 of the exhaust gas counter pressure in steps. The filter constant CON_FIL can specify the height of the steps. The height of the steps also specifies the speed, by means of which the filtered model value EGBP_MDL_FIL of the exhaust gas counter pressure approaches the current second model value or the current first model value EGBP_MDL_2, EGBP_MDL_1 of the exhaust gas counter pressure. The higher the filter constant CON_FIL, the quicker the filtered model value EGBP_MDL_FIL approaches the current second or the current first model value EGBP_MDL_2, EGBP_MDL_1 of the exhaust gas counter pressure. Such a small height can be selected for the step that only an increasing solid line can be seen instead of the steps in the scale of the curve depicted.

Figure 4:
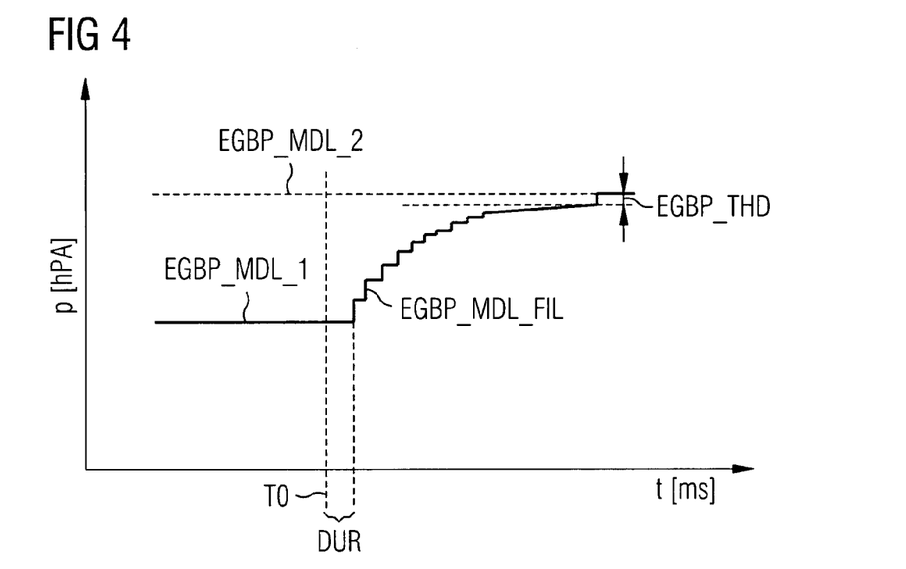

Preferably, should a switch for example take place at a point in time T0 from the low valve lift to the high valve lift X1, X2, the first model value EGBP_MDL_1 of the exhaust gas counter pressure is then, in addition, initially allocated to the current value EGBP_AV of the exhaust gas counter pressure for a predetermined duration DUR. Only after the predetermined duration DUR is the curve of the filtered model value EGBP_MDL_FIL of the exhaust gas counter pressure determined and allocated to the current value EGBP_AV of the exhaust gas counter pressure. Should a switch for example take place at a point in time T0 from the high valve lift to the low valve lift X2, X1, the second model value EGBP_MDL_2 of the exhaust gas counter pressure is then, in addition, initially allocated to the current value EGBP_AV of the exhaust gas counter pressure for a predetermined duration DUR. This can contribute to taking into account the gas running time within the internal combustion engine.

Preferably the curve of the filtered model value EGBP_MDL_1 of the exhaust gas counter pressure is only determined and subsequently allocated to the current value (EGBP_AV) of the exhaust gas counter pressure until such time as the difference EGBP_DIF is less than a predetermined threshold value EGBP_THD of the exhaust gas counter pressure.

The curve of the exhaust gas counter pressure shown is only obtained when, apart from the valve lift VLIFT, no additional final control elements are activated which have an effect on a change in the exhaust gas counter pressure. However, after the adjustment ADJ of the valve lift VLIFT, the throttle valve 5 of the internal combustion engine is activated in such a way that the adjustment ADJ of the valve lift VLIFT is preferably carried out at neutral torque. In this context, this means that a torque brought about by the internal combustion engine essentially does not change by the adjustment ADJ of the valve lift VLIFT. The effect is that for a driver of a motor vehicle which includes the internal combustion engine, the adjustment ADJ of the valve lift VLIFT remains unnoticed.

The adjustment of the throttle valve 5 acts on the mass air flow in the combustion chamber 9 of the internal combustion engine. The mass air flow in the combustion chamber 9 of the internal combustion engine acts on the mass air flow in the exhaust gas tract 4 of the internal combustion engine. Therefore, the adjustment of the throttle valve 5 is preferably taken into account when determining the curve of the filtered model value EGBP_MDL_FIL of the exhaust gas counter pressure. Relating to the lowpass filters this means that the target value for the lowpass filters, and indeed the current second model value or the current first model value EGBP_MDL_2, EGBP_MDL_1 are no longer constant, but depend on an opening degree of the throttle valve 5. The curve shown then changes such that the current second model value or the current first model value EGBP_MDL_2, EGBP_MDL_1, after the adjustment of the valve lift VLIFT on the basis of the adjustment of the throttle valve 5, approaches the first model value of the second model value EGBP_MDL_1 of the exhaust gas counter pressure when adjusting ADJ the valve lift VLIFT and that the curve of the filtered model value EGBP_MDL_FIL likewise approaches the first model value or the second model value EGBP_MDL_1, EGBP_MDL_2 of the exhaust gas counter pressure when adjusting ADJ the valve lift VLIFT.

A program (FIG. 5) for operating an internal combustion engine during the adjustment ADJ of the valve lift VLIFT and/or shortly before the adjustment ADJ of the valve lift VLIFT is preferably stored in a storage medium of the control device 25. The program is used to approach, in a suitable manner, the actual exhaust gas counter pressure, shortly before and/or during and/or shortly after the adjustment ADJ of the valve lift VLIFT. In this context, shortly before adjusting ADJ the valve lift VLIFT can for example mean immediately before adjusting ADJ the valve lift VLIFT. Shortly after adjusting ADJ the valve lift VLIFT in this context means after the predetermined duration DUR and/or until the difference EGBP_DIF is less than the predetermined threshold value EGBP_THD.

Figure 5:
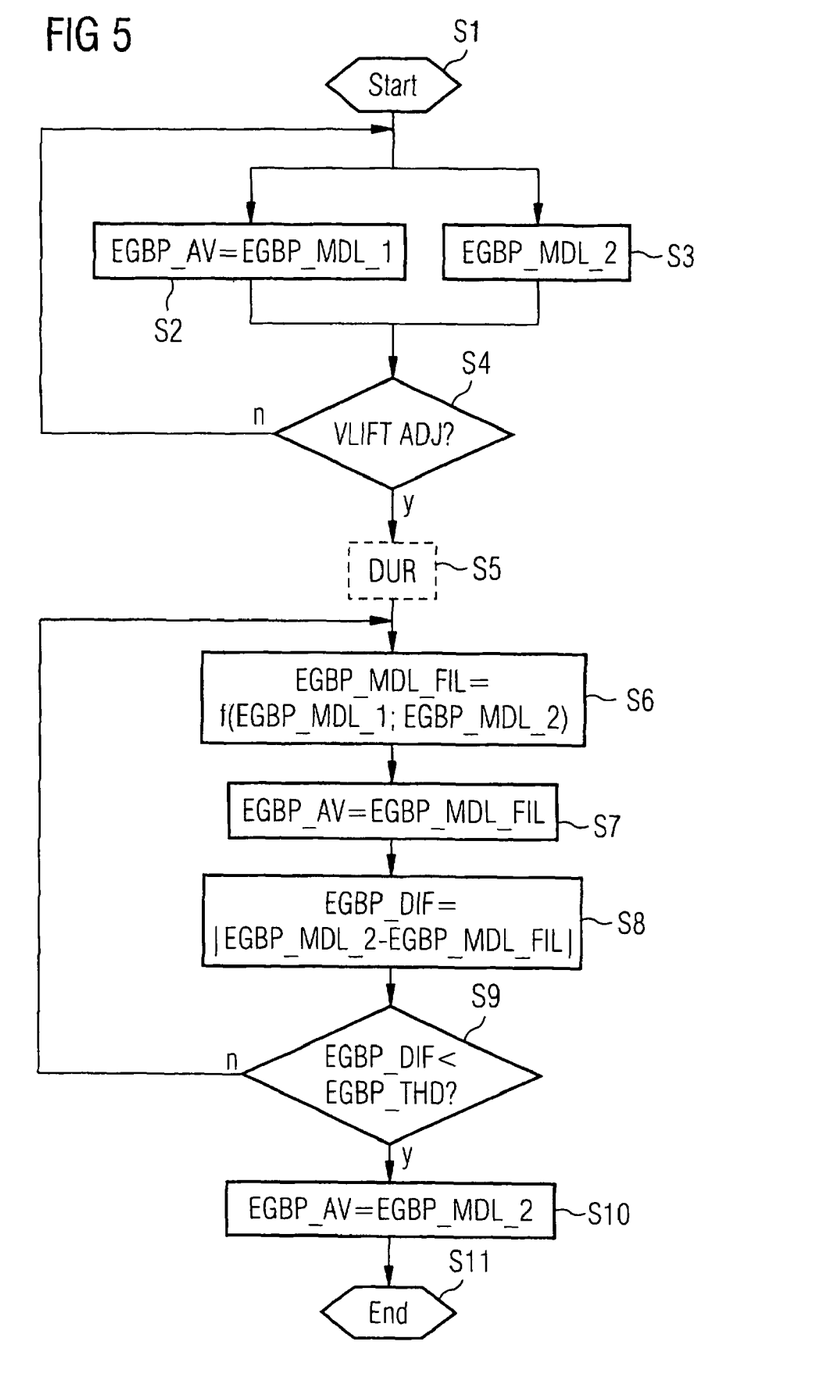

FIG. 5 explains the program by using the example of the valve lift conversion from the low valve lift to the high valve lift X1, X2. In the case of a valve lift conversion from the high valve lift to the low valve lift X2, X1, in the representation in FIG. 5 only the first model value and the second model value EGBP_MDL_1, EGBP_MDL_2 have to be interchanged.

The program is preferably started when the internal combustion engine is started in a step S1, in which variables are initialized.

In a step S2, the first model value EGBP_MDL_1 of the exhaust gas counter pressure is determined and allocated to the current value EGBP_AV of the exhaust gas counter pressure. The model values EGBP_MDL_1, EGBP_MDL_2 can for example be determined on the basis of one performance graph or a plurality of performance graphs and/or on the basis of one model calculation or a plurality of model calculations. The first performance graph and, if required, additional performance graphs are plotted in a preferred manner on an engine test bench and stored in a storage medium of the control device 25. The current value EGBP_AV of the exhaust gas counter pressure is one of the operating variables and can be used by the control device 25 as an input quantity for further calculations of additional operating variables.

The second model value EGBP_MDL_2 of the exhaust gas counter pressure is preferably determined at the same time as the first model value EGBP_MDL_1 in a step S3.

In a step S4, a test is performed to determine whether or not the valve lift VLIFT should be adjusted ADJ. If the condition of a step S4 has not been met, the processing is continued in the steps S2 and S3. If the condition of a step S4 has been met, the processing will preferably be continued in a step S5.

Said program then remains in a step S5 for a predetermined duration DUR. The predetermined duration DUR is preferably selected in such a way that the curve of the filtered model value EGBP_MDL_FIL is only determined when the mass air flow changed on the basis of the adjustment ADJ of the valve lift VLIFT has moved from the gas intake valve 12 up to the exhaust gas catalytic converter 21.

In a step S6, the filtered model value EGBP_MDL_FIL of the exhaust gas counter pressure is determined depending on the first model value EGBP_MDL_1 preferably at the point in time of adjusting ADJ the valve lift VLIFT and as a function of the current second model value EGBP_MDL_2 of the exhaust gas counter pressure. In this context, this means that in order to determine the curve of the filtered model value EGBP_MDL_FIL, the first model value EGBP_MDL_1 of the exhaust gas counter pressure is entered as a constant value in the determination of the curve of the filtered model value EGBP_MDL_FIL at the point in time of the adjustment ADJ of the valve lift VLIFT and that the current model value EGBP_MDL_2 in the determination of the curve of the filtered model value EGBP_MDL_FIL may vary as a function of the current operating condition of the internal combustion engine, in particular, as a function of the current operating point of the internal combustion engine. Alternatively, it is also possible to use the first model value EGBP_MDL_1 of the exhaust gas counter pressure immediately before or after adjusting ADJ the valve lift VLIFT for the determination of the curve of the filtered model value EGBP_MDL_FIL.

In a step S7, the filtered model value EGBP_MDL_FIL of the exhaust gas counter pressure is allocated to the current value EGBP_AV of the exhaust gas counter pressure.

In a step S8, a value of the difference EGBP_DIF of the exhaust gas counter pressure is determined.

In a step S9, a test is performed to determine whether or not the difference EGBP_DIF of the exhaust gas counter pressure is less than a predetermined threshold value EGBP_THD of the exhaust gas counter pressure. If the condition of a step S9 has not been met, the processing is continued in a step S6. If the condition of a step S9 has been met, the processing will preferably be continued in a step S10.

In a step S10, the second model value EGBP_MDL_2 of the exhaust gas counter pressure is allocated to the current value EGBP_AV of the exhaust gas counter pressure.

The program can be ended in a step S11. Preferably however, the program is continued in the steps S2 and S3.

As an alternative to the shown lowpass filter, a simple lowpass filter consisting of an RC element is used. In addition, a gradient limit can be used for filtering instead of a lowpass filter. The gradient limit is then preferably selected in such a way as a function of the first model value and the second model value EGBP_MDL_1, EGBP_MDL_2, that in the case of otherwise stationary operating conditions of the internal combustion engine, an essentially linear curve of the filtered model value EGBP_MDL_FIL of the exhaust gas counter pressure is obtained in a preferred manner. For example, it is possible for the gradient of the curve of a filtered model value EGBP_MDL_FIL of the exhaust gas counter pressure to be limited in such a way that the filtered model value EGBP_MDL_FIL of the exhaust gas counter pressure changes with a maximum of ten hectopascals per cylinder segment or per ten milliseconds.

The invention is not limited to the specified exemplary embodiments. For example, in order to filter the first model value EGBP_MDL_1 of the exhaust gas counter pressure, the lowpass filter and the gradient limit can be used. In addition, the filter constant CON_FIL can be specified in such a way that the filtered model value EGBP_MDL_FIL of the exhaust gas counter pressure changes with a maximum of ten hectopascals per cylinder segment or per ten milliseconds.

The invention claimed is:

1. A method for operating an internal combustion engine comprising:
    providing an intake tract and an exhaust gas tract having an exhaust gas catalytic converter, the intake gas track being in communication with a combustion chamber of the internal combustion engine as a function of a position of gas intake valve and the exhaust gas tract being in communication with a combustion chamber of the internal combustion engine as a function of a gas discharge valve;
    providing an intake valve lift adjusting device that adjusts a valve lift of the gas intake valve;
    determining a first model value of the exhaust gas counter pressure upstream of the exhaust gas catalytic converter that is representative of the exhaust gas counter pressure in a current operating mode of the internal combustion engine assuming a low valve lift, as a function of at least one operating variable of the internal combustion engine;
    determining a second model value of the exhaust gas counter pressure upstream of the exhaust gas catalytic converter that is representative of the exhaust gas counter pressure in a current operating mode of the internal combustion engine assuming a high valve lift, as a function of the at least one operating variable of the internal combustion engine;
    determining a curve of a filtered model value of the exhaust gas counter pressure as a function of:
        the first model value of the exhaust gas counter pressure when adjusting the valve lift and as a function of the current second model value of the exhaust gas counter pressure, or
        the second model value of the exhaust gas counter pressure when adjusting the valve lift and as a function of the current first model value of the exhaust gas counter pressure,
    the curve of the filtered model value being determined essentially during the adjustment of the valve lift from the low valve lift to the high valve lift or from the high valve lift to the low valve lift; and
    allocating a curve of a current value of the exhaust gas counter pressure to the curve of the filtered model value of the exhaust gas counter pressure during the adjustment and/or shortly before the adjustment of the valve lift.

2. The method as claimed in claim 1, wherein the curve of the filtered model value of the exhaust gas counter pressure is determined by a lowpass filter.

3. The method as claimed in claim 2, wherein the current second model value or the current first model value of the exhaust gas counter pressure is a target value for lowpass filtering.

4. The method as claimed in claim 3, wherein the curve of the filtered model value of the exhaust gas counter pressure is determined such that the filtered model value of the exhaust gas counter pressure approaches the current second model value or the first model value of the exhaust gas counter pressure in steps, and such that the filtered model value of the exhaust gas counter pressure approaches with each step the current second model value or the current first model value of the exhaust gas counter pressure to a lesser extent than in a previous step.

5. The method as claimed in claim 4, wherein, in order to determine the curve of the filtered first model value of the exhaust gas counter pressure, a maximum gradient of the curve of the filtered model value of the exhaust gas counter pressure as a function of the first model value or the second model value when adjusting the valve lift and as a function of the current second model value or the current first model value of the exhaust gas counter pressure is specified such that, with otherwise stationary operating conditions of the internal combustion engine, the filtered model value of the exhaust gas counter pressure approaches the current second model value or the current first model value of the exhaust gas counter pressure linearly.

6. The method as claimed in claim 5, wherein the curve of the filtered model value of the exhaust gas counter pressure is determined such that the curve of the filtered model value of the exhaust gas counter pressure changes with a maximum of 10hPA per cylinder segment or per 10 ms.

7. The method as claimed in claim 6, wherein:
at the point in time the valve lift is adjusted, the model value of the exhaust gas counter pressure that is representative of the exhaust gas counter pressure in the current valve lift before the adjustment of the valve lift, is kept constant for a predetermined duration and allocated to the current value of the exhaust gas counter pressure, and
the predetermined duration after the adjustment of the valve lift the curve of the filtered model value of the exhaust gas counter pressure is allocated to the curve of the current value of the exhaust gas counter pressure.

8. The method as claimed in claim 7, wherein:
the filtered model value of the exhaust gas counter pressure is compared to the current second model value or the current first model value of the exhaust gas counter pressure, and
the curve of the filtered first model value of the exhaust gas counter pressure is determined and subsequently allocated to the current value of the exhaust gas counter pressure until a difference between the filtered model value of the exhaust gas counter pressure and the current second model value or the current first model value of the exhaust gas counter pressure is less than a predetermined threshold value.

9. The method as claimed in claim 1, further comprising:
providing a gas discharge valve lift adjusting device that adjusts a valve lift of the gas discharge valve.

10. A device for operating an internal combustion engine, comprising
an engine block containing a cylinder;
a cylinder head arranged on the engine block to form a combustion chamber with the cylinder;
an intake valve arranged in the cylinder head;
a gas discharge valve arranged in the cylinder head;
an intake gas tract that communicates with the combustion chamber as a function of a position of the intake valve;
an exhaust gas tract that communicates with the combustion chamber as a function of a position of the gas discharge valve;
an exhaust gas catalytic converter arranged in the exhaust gas tract; and
a valve lift adjusting device that adjusts a valve lift of the gas intake valve or the gas discharge valve, wherein the device:
determines a first model value of the exhaust gas counter pressure upstream of the exhaust gas catalytic converter, which is representative of the exhaust gas counter pressure in a current operating mode of the internal combustion engine assuming a low valve lift as a function of at least one operating variable of the internal combustion engine,
determines a second model value of the exhaust gas counter pressure upstream of the exhaust gas catalytic converter that is representative of the exhaust gas counter pressure in a current operating mode of the internal combustion engine by assuming a high valve lift as a function of the operating variable of the internal combustion engine,
determines essentially during the adjustment of the valve lift from the low valve lift to the high valve lift or from the high valve lift to the low valve lift, a curve of a filtered model value of the exhaust gas counter pressure as a function of the first model value of the exhaust gas counter pressure when adjusting the valve lift and as a function of the current second model value of the exhaust gas counter pressure or as a function of the second model value of the exhaust gas counter pressure when adjusting the valve lift and as a function of the current first model value of the exhaust gas counter pressure, and
allocates the curve of the filtered model value of the exhaust gas counter pressure essentially during the adjustment of the valve lift to a curve of a current value of the exhaust gas counter pressure.

11. The device as claimed in claim 10, wherein the valve lift adjusting device adjusts the valve lift of both the intake valve and the gas discharge valve.

12. The device as claimed in claim 10, wherein the curve of the filtered model value of the exhaust gas counter pressure is determined by a lowpass filter.

13. The device as claimed in claim 12, wherein the current second model value or the current first model value of the exhaust gas counter pressure is a target value for lowpass filtering.

14. The device as claimed in claim 13, wherein the curve of the filtered model value of the exhaust gas counter pressure is determined such that the filtered model value of the exhaust gas counter pressure approaches the current second model value or the first model value of the exhaust gas counter pressure in steps, and such that the filtered model value of the exhaust gas counter pressure approaches with each step the current second model value or the current first model value of the exhaust gas counter pressure to a lesser extent than in a previous step.

15. The device as claimed in claim 14, wherein, in order to determine the curve of the filtered first model value of the exhaust gas counter pressure, a maximum gradient of the curve of the filtered model value of the exhaust gas counter pressure as a function of the first model value or the second model value when adjusting the valve lift and as a function of the current second model value or the current first model value of the exhaust gas counter pressure is specified such that, with otherwise stationary operating conditions of the internal combustion engine, the filtered model value of the exhaust gas counter pressure approaches the current second model value or the current first model value of the exhaust gas counter pressure linearly.

16. The device as claimed in claim 15, wherein the curve of the filtered model value of the exhaust gas counter pressure is determined such that the curve of the filtered model value of the exhaust gas counter pressure changes with a maximum of 10hPA per cylinder segment or per 10 ms.

17. The device as claimed in claim 16, wherein:
at the point in time the valve lift is adjusted, the model value of the exhaust gas counter pressure that is representative of the exhaust gas counter pressure in the current valve lift before the adjustment of the valve lift, is kept constant for a predetermined duration and allocated to the current value of the exhaust gas counter pressure, and the predetermined duration after the adjustment of the valve lift the curve of the filtered model value of the exhaust gas counter pressure is allocated to the curve of the current value of the exhaust gas counter pressure.

18. The device as claimed in claim 17, wherein:

the filtered model value of the exhaust gas counter pressure is compared to the current second model value or the current first model value of the exhaust gas counter pressure, and the curve of the filtered first model value of the exhaust gas counter pressure is determined and subsequently allocated to the current value of the exhaust gas counter pressure until a difference between the filtered model value of the exhaust gas counter pressure and the current second model value or the current first model value of the exhaust gas counter pressure is less than a predetermined threshold value.

* * * * *